United States Patent

Sordello

[15] 3,659,175

[45] Apr. 25, 1972

[54] CIRCUIT TO PREVENT OSCILLATION IN AN ELECTRONIC SERVOSYSTEM

[72] Inventor: Frank J. Sordello, San Jose, Calif.

[73] Assignee: Information Storage Systems, Inc., Cupertino, Calif.

[22] Filed: June 8, 1970

[21] Appl. No.: 44,067

[52] U.S. Cl. ................................318/624, 318/631, 318/629

[51] Int. Cl. ........................................G05b 5/01, G05b 11/01

[58] Field of Search ...........................318/631, 681, 624, 629

[56] References Cited

UNITED STATES PATENTS

| | | | |
|---|---|---|---|
| 3,110,851 | 11/1963 | Plogstedt et al. | 318/631 |
| 3,241,016 | 3/1966 | Wattson | 318/631 |
| 3,280,781 | 10/1966 | Koerner | 318/631 |

*Primary Examiner*—T. E. Lynch
*Attorney*—Gerald L. Moore and Robert B. Crouch

[57] ABSTRACT

A closed loop servosystem for positioning a device such as a read/write head in a data disc file in which the deadband in the amplifier of the system is turned on and off at a rate great enough to prevent the buildup of resonance oscillations in the system when the device reaches the zero position.

8 Claims, 3 Drawing Figures

INVENTOR.
FRANK J. SORDELLO
BY Gerald L. Moore
ATTORNEY

CIRCUIT TO PREVENT OSCILLATION IN AN ELECTRONIC SERVOSYSTEM

CROSS REFERENCES TO RELATED APPLICATIONS

The invention may be applied to such servosystems as those described in application Ser. No. 792,343, entitled "Apparatus for Maintaining a Servo Controlled Member in a Selected Position," filed on Jan. 21, 1969, and assigned to the assignee of the present invention.

BACKGROUND OF THE INVENTION

1. Field of the Invention

This invention is useful in closed loop electronic servosystems utilized for positioning mechanisms in response to address commands. The invention is particularly applicable to disc file storage devices utilized for storing data in digital form on a magnetic memory. In such devices, read/write heads are positioned in very rapid sequence over closely spaced tracks of data for the purpose of reading and writing data on the rotating magnetic disc member.

It is a primary object of this invention to limit the oscillations of a servo-controlled movable member once located near the address position with a minimum lengthening of the response time of the servosystem necessary for positioning the member at the desired address.

A further object of this invention is to substantially eliminate any audible oscillations of an electronic servo-positioned movable member, which oscillations have been found to be annoying to the persons working in the immediate vicinity of the system.

Still a further object of this invention is to limit the zero position oscillations of a servo-controlled mechanism without substantially limiting the abilities of the servosystem to move the mechanism to the desired address.

2. Description of the Prior Art

Servosystems of the type utilized in data disc drives must function accurately in positioning a read/write head within a few hundred microinches of the address desired. Since the head mechanisms must be positioned both accurately and quickly, the gain of the servosystem must be sufficiently high to accomplish the task. However, as in any mechanical apparatus the head support mechanism usually has at least one mechanical resonance point that can cause instabilities within the system when the servo includes high bandwidth capabilities as are usually needed. Thus, the play and resonating properties of the mechanical system can cause the servosystem to continually oscillate or search about the zero position.

This searching of the servosystem in a worst case can cause erroneous reading and writing of the information if the oscillating is permitted to increase sufficiently to move the head at least partially off the data track. In addition to these difficulties, the sound generated by the servosystem during such oscillations often has been found to be detectable by the human ear such that the audible signal is very annoying to the operators within the immediate vicinity of the servoed mechanism.

In the past, various efforts have been made to alleviate the problem of the oscillating servomechanism. For instance, the lowering of the total gain of the servosystem will limit or prevent the oscillation. Such lowering of the gain also is accompanied by a slower performance of the servosystem and in the case of the disc drives and such other systems, the slower reaction time cannot be tolerated. Resonant frequency filtering has been employed in an attempt to isolate the points at which oscillation occurs. Here again, the frequencies of resonance may vary from machine to machine, thereby making it necessary to tailor the filtering to each individual machine. After use of the machine, the filtering may not be effective because the resonant point may shift with machine wear and thereby change the frictional and spring constants of the movable mechanism. Such filtering also adds to the cost of the system and lowers the overall performance. Further attempts have included the building of mechanisms either having no resonant points or having resonant points shifted so as not to affect the servomechanism. These mechanisms usually have proved to be more costly and in many cases are substantially impossible to manufacture.

Thus, the more practical answer has been to utilize a deadband in the servosystem which effectively serves to turn the servo off or render it inactive when the mechanism is positioned within certain limits of the zero position. Again, however, this solution lowers the performance of the servosystem and negates its effectiveness by substantially preventing the centering of the movable member, such as the read/write head, directly over the desired track. Because of this, the readout signal is diminished in strength and the electronics within the data transmitting and reading system must be improved to accommodate the weaker signals. Thus, it is the solving of this problem of the zero position oscillations of the servosystem to which the subject invention is directed.

SUMMARY OF THE INVENTION

An electronic servosystem for positioning a mechanical device in which a deadband is utilized to limit the oscillations about the zero position. This deadband is turned on and off, such as by the use of a square-wave oscillator feeding into the amplifying system, which permits the servo to move the mechanism to the address while substantially preventing the buildup of any zero position oscillations to the point of affecting the operation of the system or causing an audible signal to be generated in the apparatus.

DESCRIPTION OF A PREFERRED EMBODIMENT OF THE INVENTION

Figures 1, 2, 3:
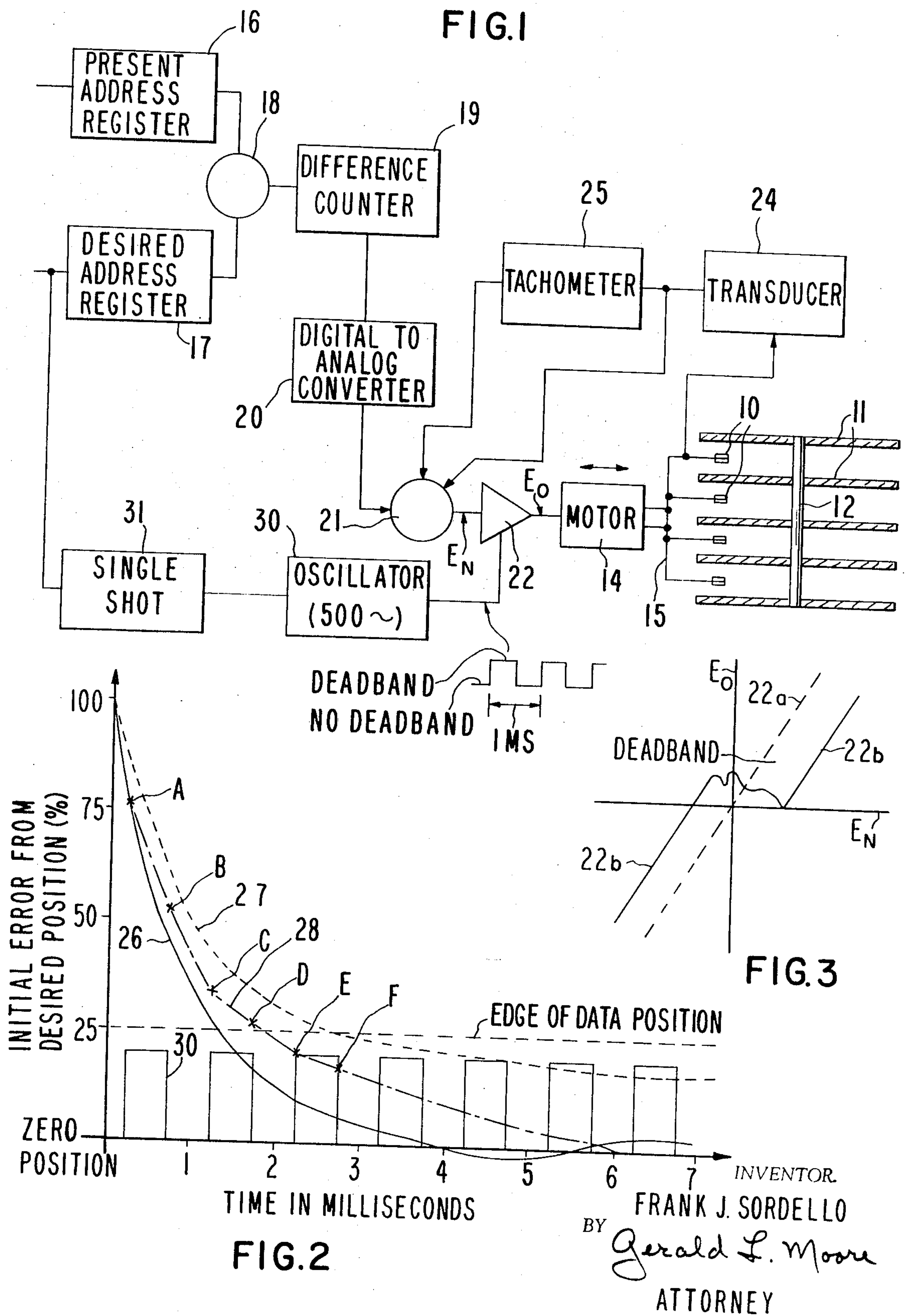
FIG. 1 is a block diagram and schematic view of an access mechanism in which the subject invention is incorporated.
FIG. 2 is a graph comparing the operation of types of servo mechanisms incorporating a deadband, no deadband and the subject invention.
FIG. 3 is a graph of the amplifier gain with and without the deadband.

FIG. 1 is an apparatus for positioning an array of read/write heads 10 relative to a stack of discs 11 which are rotated about a vertical shaft 12. For actuating the heads, a linear motor 14 is attached to the head support 15 and energized for moving the heads to positions adjacent various areas of the rotating discs. Information is recorded on both the upper and lower surfaces of the discs in circular concentric tracks, each of which is identified by an address so that the data can be retrieved. While the invention is described as being incorporated in such disc file apparatus, it should be understood that it could be used in other servomechanisms with equally beneficial results.

For controlling the head positioning, there is included a present address register 16 into which is fed information indicating the actual or present position of the heads. Into the desired position or address register 17 is fed the position of the information to be read or recorded. Signals generated by the registers are fed through a summing junction 18 to a difference counter 19 which generates a signal indicative of the distance the head must be moved for positioning adjacent the desired address which distance can be referred to as the initial error in the head position. The difference counter signal is fed to a digital to analogue converter 20 for conversion to an analogue signal which is fed through a summing junction 21 and an amplifier 22 for energizing the motor 14.

The energizing signal supplied to the motor 14 is modified by a second signal produced by the transducer 24 which detects the speed and direction of movement of the head support and, with the tachometer 25, supplies to the summing junction 21 a signal serving to modify the strength of the energizing signal for accelerating and decelerating the head as it is moved to the desired position. A more complete description of such a servo control can be obtained by reference to the previously mentioned co-pending U.S. Pat. application Ser. No. 792,343.

To illustrate the manner in which a servomechanism moves the read/write head for final zero positioning, FIG. 2 is included showing the initial error (comprising the distance the head is to be moved to transport it from the actual position to the desired position) versus time. The solid line curve 26 illustrates the manner in which the servomechanism thus far described without any deadband moves the head. It will be noted that the head is moved rapidly during the initial approximately 60 percent of its journey to the desired position, at which time the drive of the servoamplifier will be reduced because of the impending approach of the head to the desired address. At a point of approximately 4 milliseconds on the graph, the head is positioned at the desired location. However, due to the inertia of the head and mechanism, and other spring and play constants, various mechanical resonant effects are present. Such resonant conditions cause unwanted vibrations which the servomechanism attempts to suppress. In fact, the oscillations of the head may well magnify as time progresses because of the resonance frequency of the head and support mechanism. The oscillation of the head resulting from a continuous action by the servomechanism in attempting to position the head at the zero position can result in an annoying audible signal as previously described. It is the purpose of the subject invention primarily to prevent unnecessary movement of the head and prevent any audible signals from resulting by limiting such head oscillation about the zero position.

In previous devices, it has been suggested that a deadband be incorporated in the servosystem. For instance, when the head approaches the 20 percent of the final error position, the control is made to sense that the head is in the desired position and therefore cease movement of the head further toward the desired address. Such movement of the head is indicated by the dotted line curve 27. It should be noted that the gain of the servomechanism during the initial stages of the head movement from the 100 percent error signal is slightly less than the gain of the servomechanism having no deadband. This is because the head actually is being moved toward the 20 percent position and since the motor drive is proportional to the error signal, the gain is decreased to accommodate for the smaller error signal. It should be noted that the head reaches the data position indicated by the line 26, after approximately 1.3 milliseconds with no deadband in the system and at approximately 2.8 milliseconds when the full deadband is included in the servomechanism. Thus a penalty is paid for incorporating the deadband even though oscillation of the head about the zero position is prevented. Such oscillation does not result because the average gain of the system is zero when in the deadband. The deadband causes an indeterminate positioning error equal to the width of the deadband. As shown in FIG. 3, normally the motor drive signal is indicated by the dotted line 22*a;* however, with the deadband condition, the solid lines 22*b* represent the signal $E_0$ transmitted to the motor 14 in response to the input signal $E_{ll}$ received by the amplifier.

In accordance with the present invention, there is incorporated in the servomechanism a deadband condition which is cycled or "chopped" at a period shorter than the time it takes the servomechanism to reach a resonant oscillation for the apparatus being positioned. Such an intermittent deadband condition is gained by feeding an oscillator signal such as that generated by the oscillator 30 (FIG. 1) into the amplifier 22, which signal intermittently chops the deadband. In this manner, the gain of the servomechanism is decreased little as long as the error signal remains large; but the gain is decreased considerably while still remaining at some discreet value as the mechanism approaches the zero position.

To illustrate the operation of the device, the chopped deadband signal is shown by the square-wave 30. In this instance the square-wave pattern is one-half millisecond long. Thus, if the head is positioned at the 100 percent error signal position with the deadband being full off as shown, the head will be moved in accordance with a mechanism having no deadband until point A is reached. At this time, the deadband is turned on and the average gain of the servomechanism is decreased since the drive to the motor is proportional to the error signal and at this time the error signal is indicated by the difference between the present position of the head and the 20 percent deadband position. Thus, from point A to point B, the dot-dash curve 28 parallels that of curve 27, representing the full deadband signal. At point B, the deadband again is turned off and the gain of the servo parallels that of curve 26. Subsequently, at point C, the deadband again is turned on and the curve approximates the slope of curve 27. It can be seen that the gain of the servomechanism down to approximately the 40 percent error is affected very little from the gain of the servomechanism having no deadband. The servomechanism is actuated through point D, at which time the deadband condition is off to the 20 percent position, represented by point E, at which time the deadband again is on and no signal is supplied to the drive motor since the head position has passed the deadband position. At this point, however, the inertia of the mechanism carries it down to point F, where the deadband again goes off and the error signal causes an acceleration of the head toward the zero position. This continues each time the deadband goes off until finally the servomechanism positions the head over the desired address.

Thus, by the present invention, there is supplied a servomechanism wherein the benefits of having a deadband are gained so long as the time for chopping the deadband is sufficiently short to prevent a buildup of oscillations in the servomechanism. However, the use of the intermittent deadband prevents oscillation of the servomechanism while allowing the head to continue to approach the zero position once it reaches the deadband area. Thus, the head finally is moved to the center of the data address and the strongest signal is read from the data track.

A further embodiment of the invention involves the addition of a single shot switch 31 (FIG. 1) for controlling the energization of the oscillator 30. In operation, the single shot is reset by a signal indicating a change in the desired address, i.e., the read/write head 10 is to be moved to a new position. The single shot serves to inactivate the oscillator after a predetermined period of time. In this instance the single shot activates the oscillator after a delay of several milliseconds. By this arrangement, the servosystem acts initially in a linear manner to drive the heads as indicated by the curve 26 (FIG. 2) since no deadband exists in the amplifier. After sufficient time has elapsed to permit the heads to settle near the data track, the single shot fires and the intermittent deadband condition occurs.

Thus, by the embodiment just described, the quicker access time of a linear servosystem is realized until the heads are moved to the desired location. After the proper positioning and before any subsequent searching of the system can build up in intensity, the intermittent deadband condition is initiated to limit the buildup of subsequent search oscillations in the system.

The invention claimed is:

1. A servo system for controlling the energization of an actuator employed to move a member in response to a desired position signal, said system comprising:

position means for generating a signal responsive to the present position of said member, servo means for comparing the desired and present position signals to generate a signal for energizing said actuator for movement of said member from one side of the null without overshoot toward the desired position, said servo means including a deadband means having a predetermined period of intermittent operation for decreasing the gain of said servo means for a preselected portion of said period and for operating said servo means with unrestricted gain for the remaining portion of said period, thereby limiting any oscillatory movement of said member about the desired position while permitting intermittent movement of said member toward the desired position during said remaining portion of said period.

2. A servosystem as defined in claim 1 wherein said servo means includes an amplifier for modifying the actuator energizing signal.

3. A servosystem as defined in claim 2 wherein said amplifier includes a deadband condition which is cycled to cause intermittent energization of the actuator.

4. A servosystem as defined in claim 3 including means for biasing said amplifier off when the actuator energizing signal reaches a predetermined minimum value.

5. A servosystem as defined in claim 1 including a switch for controlling operation of the servo means intermittently, said switch being operated at a predetermined period in response to the receipt of a new desired position signal.

6. A servosystem for movement of a member in response to a desired position signal and for holding said member at said position comprising:

an actuator operable upon energization to move said member, means to generate a signal responsive to the present position of said member, means for comparing said present position signal to the desired position signal for generating an energizing signal for causing said actuator to move said member from one side of the null without overshoot toward the desired position, and means for cycling said energizing signal intermittently to on and off periods less than the time required by said servosystem to reach a resonant condition for said member being positioned.

7. A servosystem as defined in claim 6 wherein said cycling means includes an amplifier for modifying said energizing signal and having an intermittent deadband condition whereby no energizing signal is supplied to the actuator during preselected periods of time.

8. A servo system as defined in claim 1 wherein the slope of the curve representing the signal energizing said actuator alternately is changed during said portions of said period.

* * * * *